J. F. KELLER.
DIRIGIBLE VEHICLE LIGHT.
APPLICATION FILED AUG. 5, 1920.
1,380,972.
Patented June 7, 1921.
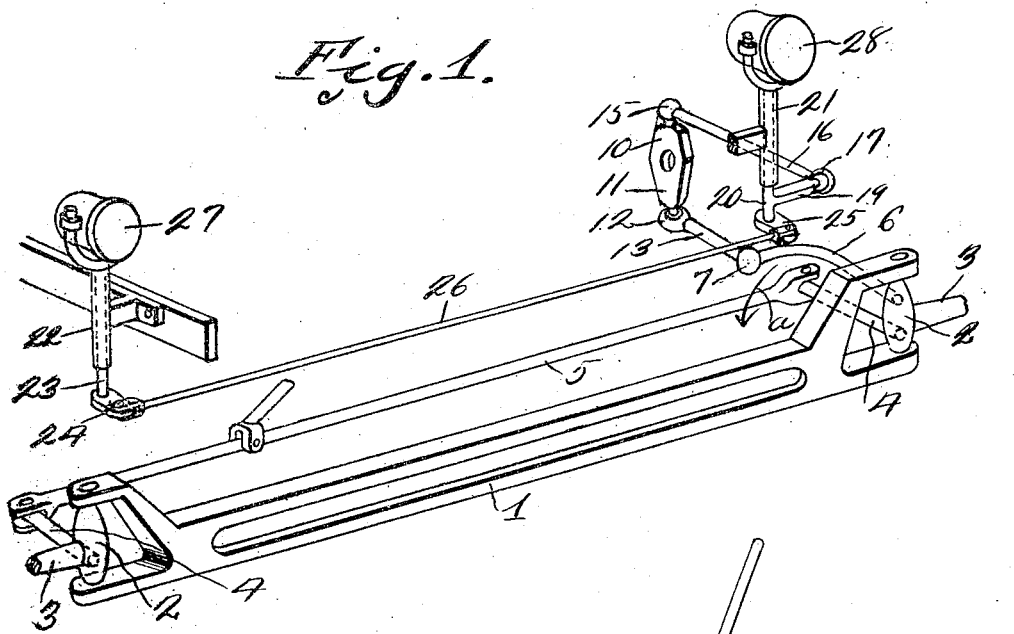
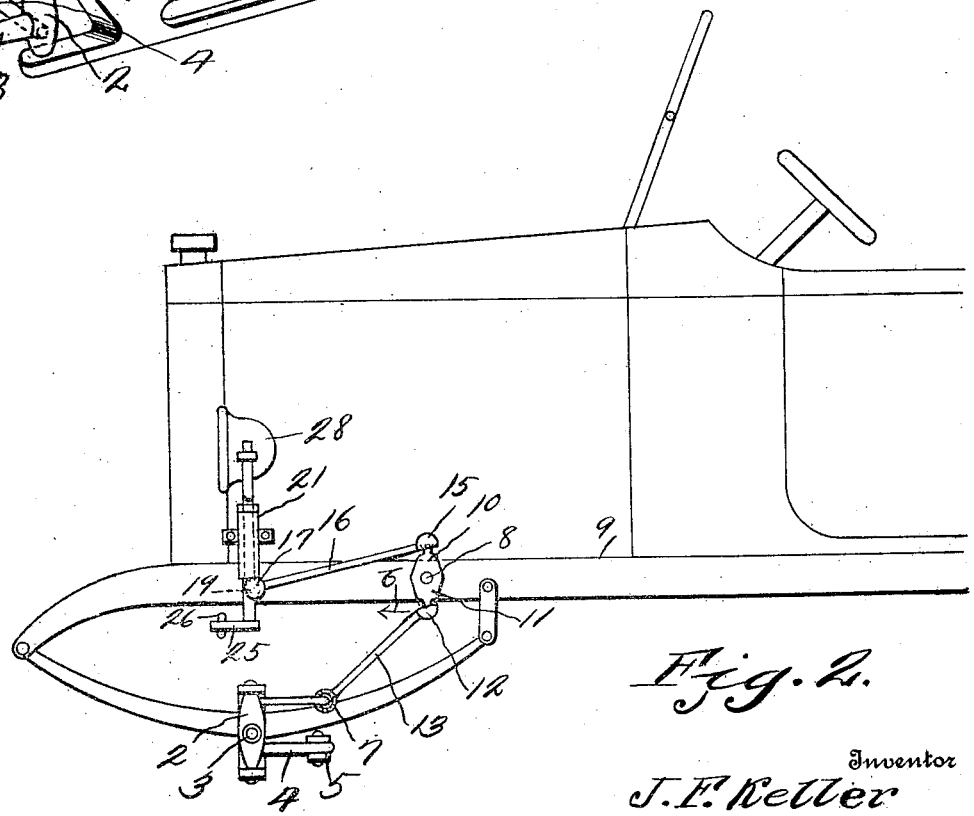
Inventor
J. F. Keller
By D. Swift
Attorney.

UNITED STATES PATENT OFFICE.

JOHN F. KELLER, OF PEARL, ILLINOIS.

DIRIGIBLE VEHICLE-LIGHT.

1,380,972. Specification of Letters Patent. Patented June 7, 1921.

Application filed August 5, 1920. Serial No. 401,550.

*To all whom it may concern:*

Be it known that I, JOHN F. KELLER, a citizen of the United States, residing at Pearl, in the county of Pike, State of Illinois, have invented a new and useful Dirigible Vehicle-Light; and I do hereby declare the following to be a full, clear, and exact description of the invention, such as will enable others skilled in the art to which it appertains to make and use the same.

The invention relates to dirigible headlights for motor driven vehicles and has for its object to provide lights of this character which will turn in the same direction as the wheels of the vehicle so that the lights will be positioned to reflect on the road, for instance when a vehicle is going around a curve.

A further object is to provide dirigible lights for motor driven vehicles comprising lights located at each side of the vehicle and vertically pivoted in brackets by shafts located in the brackets. The lower ends of the shafts are provided with forwardly extending arms, which are connected together by a link, one of said shafts having an angularly disposed arm, which arm is linked to a rockable member which is pivoted centrally, said rockable member being in turn linked to an arm carried by one of the wheel spindle members of the vehicle.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the dirigible headlights and the forward running gear of a conventional form of automobile.

Fig. 2 is a side elevation of the front end of an automobile, showing the headlight mechanism applied thereto.

Referring to the drawings, the numeral 1 designates the front axle of the automobile and 2 the spindles which are pivotally mounted in the ends thereof and adapted to receive wheels on their stubs 3. Extending rearwardly from the spindles 2 are arms 4, which arms are connected together by the connecting rod 5. Connecting rod 5 is operated from the steering mechanism of the vehicle so that the wheels will be simultaneously moved. It is to be understood that the device may be applied to any form of steering mechanism according to the type of vehicle on which the same is used. Extending rearwardly and curving inwardly from one of the spindles 2 is a lamp operating arm 6, said arm terminating in a universal joint 7. Pivoted as at 8 to one side of the vehicle frame 9 is a rockable lever 10. The arm 11 of the lever 10 has connected thereto by means of the universal joint 12, a connecting rod 13, the forward end of said connecting rod being universally connected to the arm 6 by the universal joint 7. It will be seen that by providing the universal joints 7 and 12 that as the arm 6 moves in the direction of the arrow *a*, a forward pull will be imparted to the arm 11 of the lever 10 in the direction of the arrow *b*. When the arm 11 moves forwardly in the direction of the arrow *b*, the arm 15 moves rearwardly thereby pulling rearwardly on the connecting link 16, which connecting link at its forward end is provided with a universal connection 17 which connects the connecting rod 16 to the arm 19 of the pivoted vertical lamp standard 20. Standard 20 is pivotally mounted in a bracket 21 secured to the side of the automobile, the fender or in any suitable place.

Pivotally mounted in the bracket 22 on the opposite side of the vehicle is a lamp standard 23; the lower end of said lamp standard 23 is provided with a forwardly extending arm 24, said forwardly extending arm being connected to a forwardly extending arm 25 of the lamp standard 20 by means of a connecting rod 26, which connecting rod will cause the lamp 27 to simultaneously swing as the lamp 28 swings, thereby causing the light to be reflected on the road ahead of the vehicle, no matter whether the vehicle turns to the right or to the left.

From the above it will be seen that a dirigible headlight mechanism for motor driven vehicles is provided which is positive in its operation and one wherein the mechanism is simple and the flexing of the springs of the vehicle will be allowed without breaking or injuring the mechanism.

The invention having been set forth what is claimed as new and useful is:—

A dirigible headlight mechanism for automobiles comprising a vertically pivoted lamp bracket, the lower end of said bracket having a transversely disposed outwardly extending arm, a lever pivoted to the side of the automobile, said lever being pivoted at its central point forming an upwardly and downwardly extending arm, a connecting link between the upwardly extending arm of the lever and the outer end of the bracket arm of the lamp, the pivotal points of said connecting link being formed by universal joints, a rearwardly and inwardly extending arm carried by the axle spindle of the automobile, a connecting link universally connected to and extending rearwardly from said rearwardly and inwardly extending arm, the rear end of said last named connecting link being connected to the downwardly extending arm of the pivoted lever by means of a universal joint.

In testimony whereof I have signed my name to this specification in the presence of two subscribing witnesses.

JOHN F. KELLER.

Witnesses:
  PAUL KNOX,
  J. W. HUNNICUT.